United States Patent [19]

Karabed et al.

[11] Patent Number: 4,681,324

[45] Date of Patent: Jul. 21, 1987

[54] HOLOGRAPHIC GAME CARDS

[76] Inventors: Razmik Karabed, 287 Tradewinds Dr., San Jose, Calif. 95123; Raphael Mehrbians, 544 Marine World Pkwy., Redwood City, Calif. 94065

[21] Appl. No.: 817,414

[22] Filed: Jan. 9, 1986

[51] Int. Cl.⁴ .............................................. A63F 1/02
[52] U.S. Cl. .................................... 273/295; 273/288; 283/86; 350/3.6
[58] Field of Search ............... 273/292, 293, 295, 305, 273/288, 289, 290, 291; 40/625; 283/86; 350/3.6

[56] References Cited

U.S. PATENT DOCUMENTS 4,175,750 11/1979 Rugheimer et al. ............. 273/157 R
4,560,426 12/1985 Moraw et al. ..................... 40/625 X

*Primary Examiner*—Anton O. Oechsle
*Attorney, Agent, or Firm*—Jacques M. Dulin

[57] ABSTRACT

A deck of playing cards wherein part or all of the indicia indicating the value of each card is formed of a holographic image which is clearly viewable from one range of angles, such as angles at or near an axis perpendicular to the surface of each card, and is obscured at other angles outside of or oblique to such range of angles. In one form the entire front surface of each playing card is formed with holographic images, and in another form only images adjacent to the periphery of each card are formed holographically. Cards constructed in accordance with the disclosure render difficult or impossible the viewing of a player's hand by persons standing or sitting near the holder.

9 Claims, 5 Drawing Figures

HOLOGRAPHIC GAME CARDS

BACKGROUND OF THE INVENTION

1. Field of the Invention

This invention relates to game cards such as playing cards widely available in commerce in decks of 52 cards, and particularly to such game cards in which some or all of the indicia on the cards are composed of holographic images that cannot be viewed conveniently from angles oblique of a normal viewing angle.

2. Description of the Prior Art

Widely available playing cards are typically used in decks of 52 and bear one of four suit indicia and one of thirteen value or pip indicia. In most card games, all or part of the deck is distributed among the players and each player often is required by the rules of the game to take some action, such as bidding or betting, before actual play commences. In order that any such game be fair and constitute a true test of each player's skill, it is imperative that each player know the contents of his or her hand and that every other player not know the contents of his or her hand.

In card games involving the betting of amounts of money, it is not unknown for fraudulent players or bystanders to attempt to ascertain the holdings in the hand of one of the players which can be used by the other players to obtain an unfair advantage. Another situation where play according to the rules can be frustrated is in games played by children, many of whom are careless in concealing the nature of their card holdings.

No satisfactory approach to alleviation of these problems, other than to encourage players to play their cards "close to the chest," is known.

The art and science of holography are well established, and many articles and treatises regarding the subject are available. A particularly useful and practical work on the subject is "Holography Handbook," by Unterseher, et al. (Ross Books, Berkeley, 1982).

SUMMARY OF THE INVENTION

In accordance with the present invention, card indicia that identify the suit and the value of each card are formed by holographic images that are made so as to have a characteristic of being clearly visible along a viewing axis, typically an axis normal or approximately normal to the plane of the playing card surface. The holographic images, however, are obscured to the point of indistinguishability at angles oblique of the viewing axis. Thus, games played with playing cards according to the present invention will result in a better test of the relative skill of the players and deter if not eliminate any fraudulent persons who might attempt to obtain a view of the holdings of one of the players.

In one form of game cards made according to the invention the entire indicia-bearing surface of each card is formed of holographic images to achieve the security or privacy mentioned previously. Although this form of the invention affords maximum security against unintended viewing of a player's card holdings, there can be cases where, when the cards are laid on the playing surface during play, suit and value of the card can be perceived by others only along the viewing axis.

In another form of playing cards according to the invention, the suit and value of each card at the peripheral margin of each playing card is formed by holographic images, but the suit and value indicia at the center of the card are formed with conventional printing. Although cards of this form afford slightly less security than those referred to in the preceding paragraph, they are much more easily viewed by all players when placed face up on the table as the play of a game progresses.

The foregoing, together with other objects, features and advantages, will be more apparent after referring to the following specification and the accompanying drawings.

DETAILED DESCRIPTION OF THE PREFERRED EMBODIMENTS

The following description concerns conventional playing cards used in such games as bridge, poker and the like. Such are employed to illustrate the invention because of the prevalence of ordinary playing cards as compared to other specialized game cards. However, the specific examples used for illustration are not to be considered limiting. Only the appended claims define the true spirit and scope of the invention.

Figure 1:
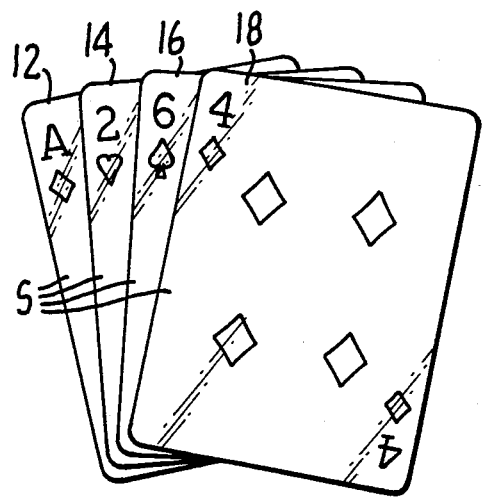
FIG. 1 is a pictorial view of an exemplary hand of cards that incorporate one embodiment of the invention.
Figure 2:
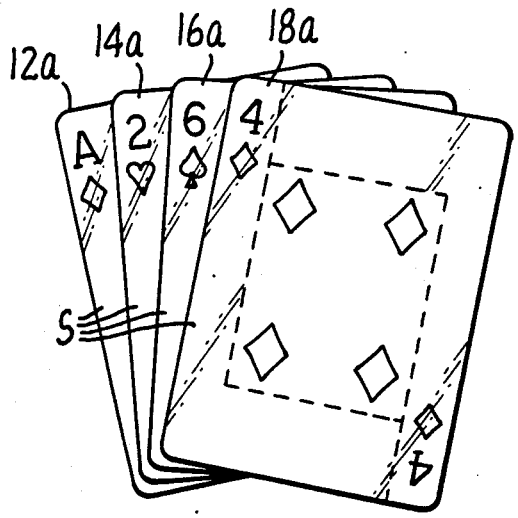
FIG. 2 is a pictorial view of an exemplary hand of cards that incorporate another embodiment of the invention.

Referring more particularly to the drawings and to FIG. 1, a typical hand made up of four cards 12, 14, 16 and 18 is shown, the specific holdings in this hand containing the ace of diamonds 12, the two of hearts 14, the six of spades 16, and the four of diamonds 18. As is well known, the position of the cards in the hand depicted in FIGS. 1 and 2 is typical of the position in which a typical card player holds his or her cards during play and during bidding or betting prior to play. The card surfaces S seen in both FIGS. 1 and 2 are the surfaces viewed by the player. These surfaces of each card bear indicia that indicate the value of each card, i.e., both its suit and its pip denomination. As is typical in all playing cards and indeed is essential, the opposite surfaces of the cards (not shown) contain a design or the like that is identical for each card so that only the holder of a hand can know of the holdings. For convenience and precision of description the card surfaces S seen in FIGS. 1 and 2 will be referred to as the front surfaces of the cards to distinguish such from the opposite surfaces which contain some design that is uniform and consistent throughout the entire deck of cards.

In the embodiment of FIG. 1 the entire front surface S of each playing card is formed by a holograph. As will appear in somewhat more detail hereinafter, a holograph used in practicing the present invention possesses the properties that when viewed from one viewing direction or range of viewing directions, the images are relatively clear, and that when viewed from all other directions, the images are so blurred as to be indistinguishable from one another. Thereby is achieved the principal object of the invention which is to render difficult, if not impossible, the detection of a player's holdings by any bystander or other player in a card game. Although formation of holograms per se employs no novel principles, a brief summary of the procedure is here given.

Figure 4:
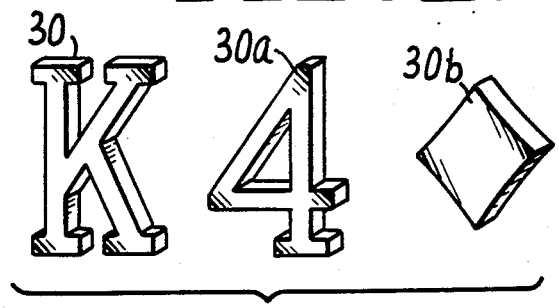
FIG. 4 is a perspective view of three shaped bodies which exemplify those employed in forming holographs needed for producing a deck of playing cards according to the invention.

As has been previously indicated, the property of a holograph that is crucial to the present invention is that it can be made such that its image can be viewed clearly within a certain limited range of directions and becomes completely unintelligible at directions oblique of such range of directions. As described in more detail in the previously cited Unterseher reference, a holograph is made in two or more stages, the first being to create a transmission hologram of the object in question. A hologram is a transparent colorless image which bears no visual similarity to the object that it depicts but which contains interference fringes which afford, after further processing, a holograph of the image that visually corresponds to the object. The apparatus for forming a transmission hologram and the holographs forming the front surface of the playing cards is shown schematically in FIG. 5. The object of the hologram is indicated by an object in the shape of an upper case letter "K", indicated at 30. The letter "K" signifies king and the object representing the "K" is shown in perspective in FIG. 4. The characters as well as all others needed for the indicia in a deck of playing cards are constructed in a similar fasion, FIG. 4 including a "4" 30a and a diamond 30b. One satisfactory construction of each character is to employ a sheet of aluminum or the like with a thickness of ¼ inch more or less from which each of the characters is cut. All surfaces are then polished so that the resultant article has a highly reflective surface, a characteristic that leads to clearer and sharper holographic images. Referring again to FIG. 5, object 30 is placed on the upper surface 32 of a conventional optical bench and adjacent to the surface of a film plate 34 which is supported in a plate holder 36 of conventional construction. On photographic plate 34 is formed the transmission hologram and during the set-up of the apparatus the plate must be protected from ambient light. Also supported on optical bench surface 32 is a laser identified at 38. The laser, when excited, produces a beam 40 of coherent light, that is, light having a single frequency and phase. Positioned adjacent to the laser 38 is a shutter mechanism 42 which is employed to control the time of exposure of photographic plate 34 to the laser beam. Spaced from shutter 42 along the laser beam is an opaque plate having an aperture for confining the laser beam, the plate being indicated at 44. Next along the path of beam 40 is a spatial filter 46. Filter 46 is constructed and oriented so as to transmit a portion 40a of beam 40 and to reflect a portion 40b. Within the path of reflected beam portion 40b is disposed a 50/50 beam splitter 48 which transmits one half of the energy impinging on the beam splitter along a path 40b1 and reflects one half of the energy along a reflective path 40b2. Within each of the paths is an object mirror, there being an object mirror 50 in path 40b1 and an object mirror 52 in path 40b2. The respective object mirrors are positioned so as to reflect the beams impinging on them to the sides of object 30. The portion 40a of beam 40 that is transmitted by filter 46 is focussed by a lens 54 onto a collimating mirror 56 which has a concave reflective surface that converts the divergent beam from lens 54 to a linear advancing beam wave or front indicated schematically at 58. The latter wave impinges on photographic plate 34 and coacts with the beams reflected back from object 30 onto the photographic plate to form a transmission hologram. Opague cards or plates 59 are placed at strategic locations on bench surface 32 in order to reduce or eliminate unwanted light from film plate 34. As indicated previously, the transmission hologram, although bearing no visual similarity to object 30, contains optical information from which a holograph of the image can be created.

As is described in the above-cited Unterseher reference and is known by those versed in the art of holography, the characteristics of the image are dependent upon numerous parameters such as the ratios of curvature of collimating mirror 56, the angle at which the mirror is disposed, the intensity of the laser beam impinging thereon and the time of exposure as controlled by shutter mechanism 42. In producing holograms used in the invention, the parameters are established to achieve a relatively narrow range of directions or angles at which the viewer typically views his or her card holdings. That range of directions or angles is typically centered on an axis that lies substantially perpendicular to the plane of front surface S. At angles outside of such range, however, the holographic images are virtually indistinguishable from one another and from the background on which the images are formed. This characteristic is largely governed by the angle of of the various reflective and transmissive optical elements in the system. Thus the equipment and procedures described immediately above are employed to produce 52 individual transmission holograms, one for each card in a deck. Next these transmission holograms are used to produce holographs which produce the desired visual effects in white light, the type of illumination almost universally present in the playing of card games.

Figure 5:
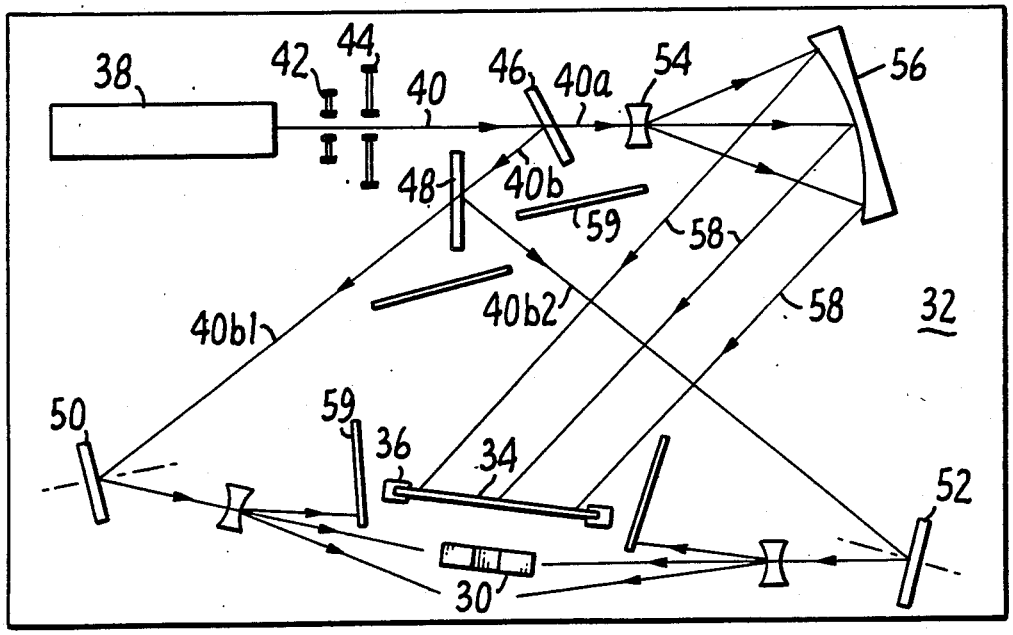
FIG. 5 is a partially schematic plan view of an optical bench and the associated apparatus that can be employed in forming the holographs used in manufacturing cards in accordance with the invention.

Such holographs are produced with apparatus substantially identical to that seen in FIG. 5 but arranged differently. Because such procedures are well known and are indeed well documented in the Unterseher reference they will not be described in detail except to observe that in forming the holograph from the transmission hologram there are two plate holders, one for the now developed transmission hologram and a second for a photographic plate that becomes the holograph. By appropriate laser excitation of the two photographic plates the information on the transmission hologram is transferred to the plate that becomes the holograph in proper phase relations to produce the requisite images that are visible in white light.

Figure 3:
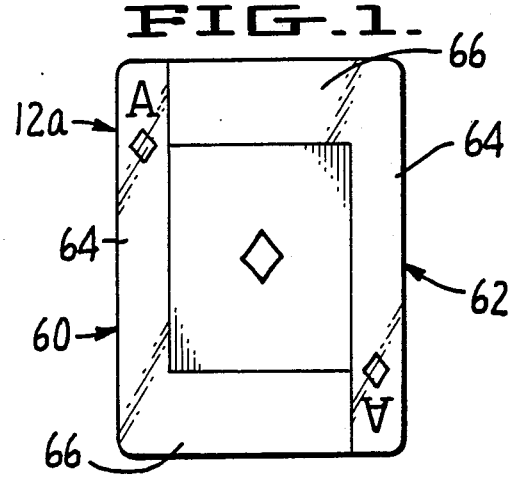
FIG. 3 is an elevation view of two hologram segments employed in manufacturing cards in accordance with the embodiment shown in FIG. 2.

Only one set of transmission holograms is needed to produce numerous sets of holographs that eventually constitute all or a part of the front surface of the game cards. The holographs can be of the reflection type, the image plane type, the rainbow type, or the pseudo-color reflection type, such types being known to those skilled in the art and described more fully in such references as the previously cited Unterseher reference. Using rainbow holography, hearts and diamonds can be created different from spades and clubs in the sense that in the final holographs applied to the front surface of the playing cards, a contrast in color between those suit pairs will be manifested. This effect can be achieved by varying the angle of the reflection beam and imparts a desireable characteristic to playing cards embodying the invention. It will be appreciated that objects 30 and 30a (FIG. 4) can be employed in forming suits that are typically red (diamonds and hearts) and suits that are typically black (clubs and spades). Pseudo-color holography is also a useful technique in practicing the invention and results in holograms having images with contrasting colors on the same holographs. In the embodiment of FIG. 1, the entire front surface of each card is formed by a holograph. In forming the game cards seen in FIG. 1 the holograph is adhered to the playing card body via adhesive or the like, the playing card body being formed of cardboard, plastic or any other suitable opaque material as employed in conventional playing cards. Playing cards according to the embodiment of FIG. 1 afford the advantage that even the uppermost card, a four of diamonds in the figure, is obscured to all but the holder of the cards viewing the cards from a direction within the limited range of directions at which the card indicia are visible. An alternate embodiment of the invention is depicted in FIG. 2, which shows a typical hand containing four cards indicated at 12a, 14a, 16a and 18a. The peripheral margin of each card is formed by a holograph and the central region of the card is formed in accordance with the conventional and widely known printing techniques. A preferred procedure for forming cards according to the embodiment of FIG. 2 is seen in connection with FIG. 3. In FIG. 3 is shown a pair of substantially congruent L-shaped holographs 60 and 62. Each has a relatively long leg 64 and a relatively short leg 66. At the end of long leg 64 of each L-shaped member are indicia which indicate the value and suit of the playing card. In forming a playing card, two substantially identical L-shaped articles are combined as shown by the dashed lines in FIG. 2 to produce on the front surface of the card an image that is symmetrical about the central axes of the card but that otherwise possesses the properties of the invention. More specifically, the end of the relatively short leg 66 of each member is abutted against the inside surface of the relatively long leg of the other member. The configuration depicted in FIG. 3 lends itself to effecient production of cards according to the invention and to uniformity among the cards so produced. In forming cards according to the embodiment of FIGS. 2 and 3, the two L-shaped members are positioned on the card stock and adhesively or otherwise bonded thereto. In connection with the affixation of the L-shaped elements to the card stock, the adhered holographs and card stock can be rolled between two suitable rigid rollers so that the front surface of the card is virtually smooth and therefore capable of being shuffled, dealt and subjected to any other activities typically practiced in usage of the cards.

Thus it will be seen the present invention provides a game card that is amenable to use in a manner identical to that followed in existing game cards and a game card that affords additional privacy or exclusivity of access to card holdings by the holder of the cards to the end that game play and activities occurring before game play can proceed in accordance with the rules of the game and the skill of the players, and not other extraneous factors.

Although two embodiments of the invention have been shown and described, it will be obvious that other adaptations and modifications can be made without departing from the true spirit and scope of the invention.

What is claimed is:

1. A deck of game cards wherein each card has a front surface which bears indicia that distinguish the card from other cards in the deck, a planar holographic member forming a holographic image and being disposed on said front surface, said image constituting at least a part of said indicia, said holographic member being arranged to afford a substantially unimpeded view of the image in a limited range of directions with respect to said front surface and to be substantially indistinguishable at directions outside of said limited range.

2. A deck of cards according to claim 1 wherein said limited range of directions is generally symmetrical with respect to a direction substantially perpendicular to said front surface.

3. A deck of cards according to claim 1 wherein a first plurality of individual cards each have holographic images appearing as a given color within said limited range of directions and wherein a second plurality of individual cards each have holographic images appearing as a color that contrast with said given color within said limited range of directions.

4. A deck of cards according to claim 1 wherein said indicia include peripheral indicia substantially confined to the peripheral margin of the respective card at diagonally opposite regions thereof and central indicia inward of said peripheral margin.

5. A deck of cards according to claim 4 wherein said holographic member is substantially coextensive with said front surface so that said peripheral indicia and said central indicia are formed by holographic images.

6. A deck of cards according to claim 4 wherein said holographic member is confined to the peripheral margin of said front surface, said holographic member having holographic images forming said peripheral indicia, and wherein said central indicia are formed to afford omnidirectional viewing of said central indicia.

7. A deck of cards according to claim 6 wherein said holographic member is formed by two substantially congruent members adapted for collocation on the peripheral margin of said front surface.

8. A deck of cards according to claim 7 wherein each of said congruent members defines a substantially L-shaped body, each said body having a relatively long leg and a relatively short leg extending perpendicularly for one end of said long leg, said short leg having an end edge remote from and parallel to said long leg and adapted to abut the said edge of the long leg of the other L-shaped body so as to be coextensive with the peripheral margin of said front surface.

9. A game piece having:
(a) a game piece front surface which bears indicia related to a game activity or value;
(b) a holographic member forming a first holographic image disposed on at least a portion of said front surface and constituting at least a part of said indicia;
(c) said holographic member constituting means affording a substantially unimpeded view of the image in a relatively narrow and limited range of direction with respect to said front surface and to be substantially indistinguishable at directions outside of said narrow and limited range.

* * * * *